UNITED STATES PATENT OFFICE.

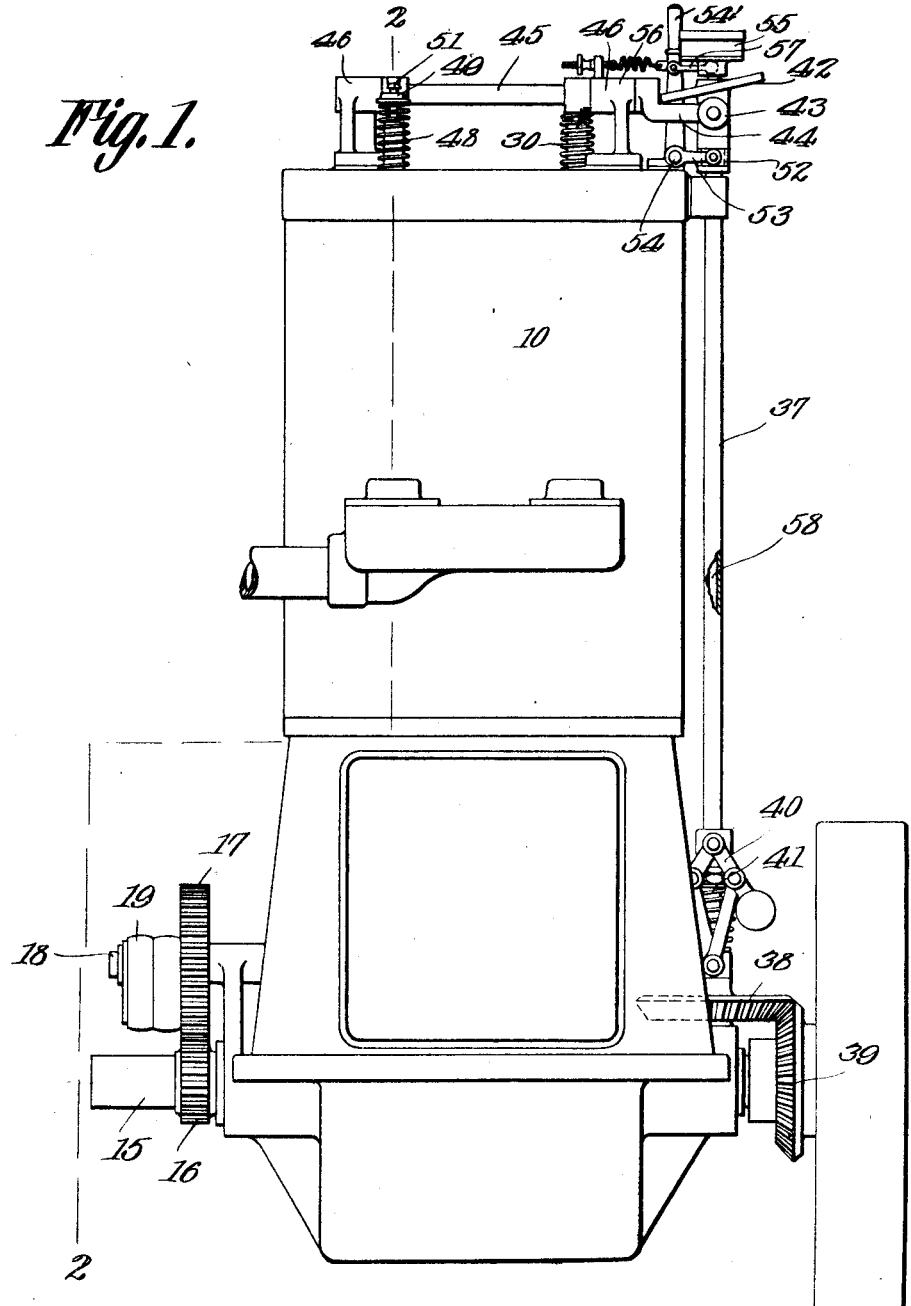

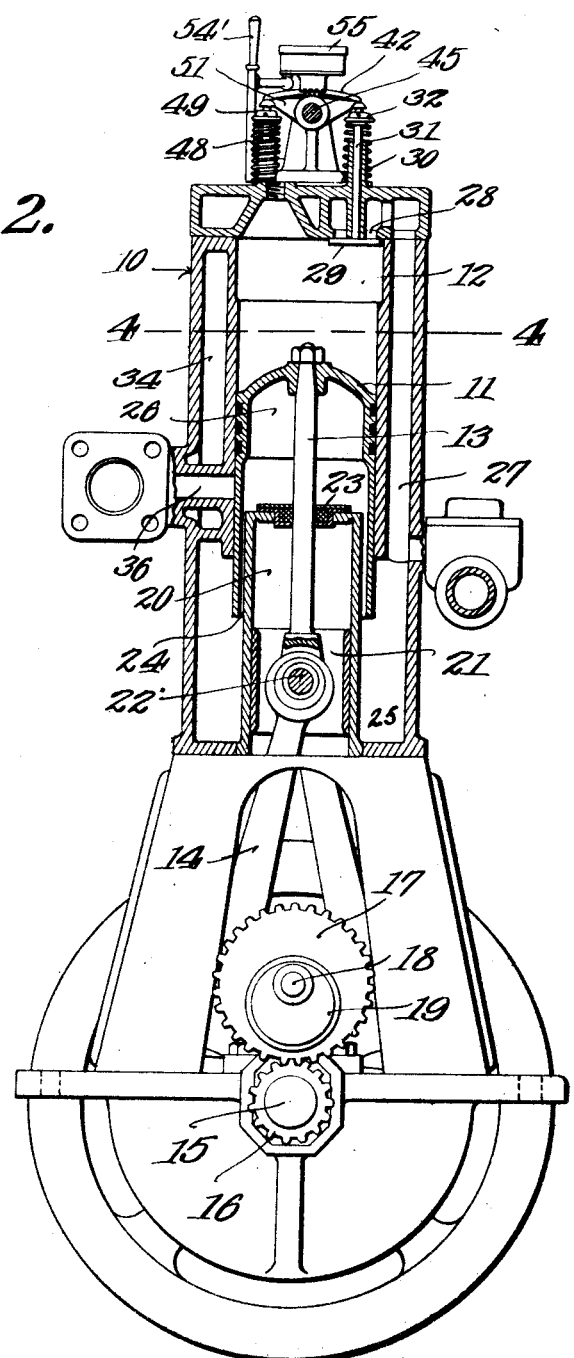

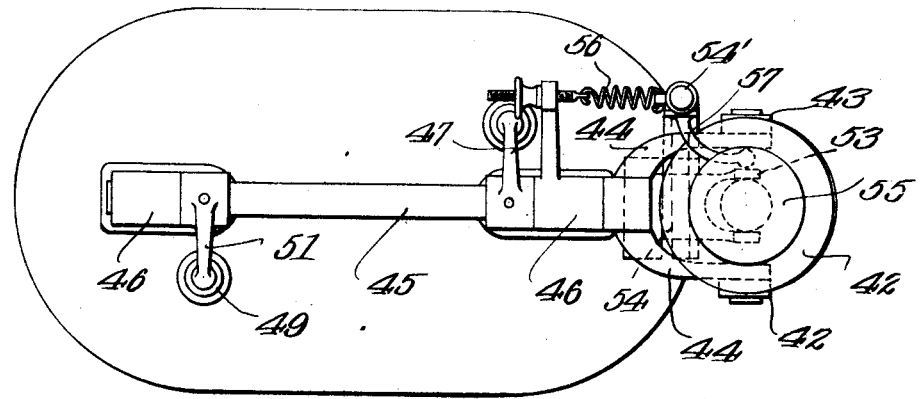
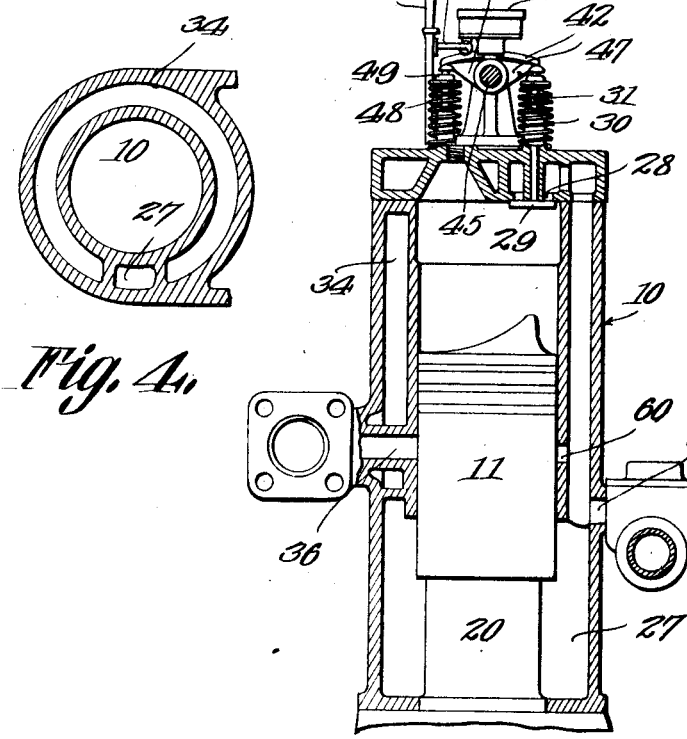

MILAN W. HALL, OF BALTIMORE, MARYLAND, ASSIGNOR TO HALL-SEELEY MOTOR CORPORATION, OF BALTIMORE, MARYLAND, A CORPORATION OF DELAWARE.

TWO-CYCLE GAS-ENGINE.

1,158,380.  Specification of Letters Patent.  Patented Oct. 26, 1915.

Application filed November 22, 1912, Serial No. 732,849. Renewed January 25, 1915. Serial No. 4,406.

*To all whom it may concern:*

Be it known that I, MILAN W. HALL, a citizen of the United States, residing at Baltimore city, State of Maryland, have invented certain new and useful Improvements in Two-Cycle Gas-Engines, of which the following is a specification.

This invention relates to that type of explosive engines of the class commonly known as gas engines and has for its object to improve the construction and operation of such engines of the two cycle type in the respects hereinafter specified.

The primary special object of the present invention is to provide such engines with improved means whereby more or less of the new charge of gas may be permitted to return to the primary compression chamber during the compression stroke of the piston, whereby the volume and compression of the new gas may be varied during said stroke, a complete range of speed control secured to suit the variation of load or speed requirements, greater fuel economy obtained by operating the engine at the most efficient ratio of expansion obtainable from a charge of exploded gas and adopting the proper ratio of volume of compression space to the piston displacement and properly adjusting the cut off.

A further object of my improvements is to enable automatic ignition by high compression to be successfully employed by regulating the compression to the exact firing point that it may not occur either too early or too late, a further degree of fuel economy being secured by thus operating the engine normally at a much higher compression than ordinarily.

A further object of my invention is to permit the engine to be designed to suit the fuel requiring the highest compression and at the same time to permit of the use of other fuels requiring a lower compression.

A further object of the invention is to permit engines of moderate size, such as those for automobiles or motor boats, or stationary engines, to be equipped with electric ignition to operate upon a carbureted mixture, so that they may be readily started by hand.

A further object of the invention is to eliminate the waste at the exhaust port in engines of larger sizes employing power starting devices and operated on the fuel injection system, whereby a further degree of fuel economy is secured.

With these specified objects, and such other objects as may hereinafter appear, in view, the invention consists in the improved construction, arrangement and combination of parts of engines of the specified classes as will be hereinafter fully described and afterward specifically claimed.

In order that its construction and operation may be readily comprehended, I have illustrated a preferred embodiment of my invention, and a modification thereof, in the accompanying drawings and will now proceed to fully describe the same having reference to said drawings in which—

Figure 1 represents, in side elevation, an engine embodying my improvements, parts being broken away, Fig. 2 represents a view of the same, partly in end elevation but principally in vertical section on the plane indicated by the broken line 2—2 of Fig. 1, looking toward the right hand, Fig. 3 represents a top plan view, Fig. 4 represents a sectional view on the horizontal plane indicated by the broken line 4—4 of Fig. 2, and Fig. 5 represents a sectional view of a slightly modified construction, taken on the same plane as the sectional view of Fig. 2.

Like reference characters mark the same parts wherever they appear in the several figures of the drawings.

Referring specifically to the drawings 10 indicates the cylinder of an engine of the explosive type in which is actuated the piston 11 by means of an explosion of gas in an explosion or combustion chamber 12, said piston being provided with a piston rod 13 connected in the usual manner by a pitman 14 to a crank shaft 15 which carries a pinion 16 meshing with a gear wheel 17 on a shaft 18 carrying eccentrics 19, all of which parts may be of any usual or well known construction and operate as usual in this class of engines with the exceptions hereinafter noted.

Within the cylinder 10 is mounted a hollow, bottomless pillar or cylinder 20 in which is mounted to slide, a crosshead 21 forming a support for the pin 22 which connects the piston rod 13 and pitman 14, the former projecting through the open bottom and the latter moving in a stuffing box 23 in the closed top of the pillar 20, said pillar being of such a diameter as to leave an open space 24 around it, in the piston head.

The lower end of the cylinder at 25, forms what I denominate the primary compression chamber, which communicates with the interior 26 of the piston 11 through the annular space 24, between the pillar 20 and the wall of the piston, hereinbefore mentioned, and also communicates by means of a channel 27 and a port 28 with the combustion chamber 12 above the piston, said port being located in the top wall of the combustion chamber and controlled by a valve 29 normally held closed by a spring 30 around the stem 31 of said valve, which stem slides freely vertically in sleeves which are secured to, or formed integrally with the top wall of the cylinder, said spring 30 being coiled about the upper section of said sleeve above the piston, having its lower bearing on top of the cylinder and its upper bearing under a ring 32, adjustably secured on the valve stem. The cylinder is provided with the usual water or other cooling chamber 34, annular in form except for the portion taken up by the channel 27 which communicates between the primary compression chamber and the combustion chamber as hereinbefore described.

The engine so far as described would operate as follows: Gas being admitted through the port 35 into the primary compression chamber 25 and through the annular passage 24 into the interior 26 of the piston 11, when this gas is under sufficient pressure, a portion thereof will pass through the channel 27 and port 28, opening the valve 29 by overcoming the force of the spring 30, thus passing into the combustion chamber 12. The upward stroke of the piston will compress the gas in the combustion chamber 12, the valve 29 being held normally closed, and when this charge of gas is exploded the piston will be forced downward until the upper end of the piston has reached the exhaust port 36, when the exhaust will take place. During this downward motion of the piston the contents of the interior 26 of the piston head, which is in free communication with the primary compression chamber 25 through the annular passage 24, will be forced through said annular passage, the primary compression chamber 25, the channel 27, port 28, and valve 29 into the combustion chamber 12 as the exploded gases are exhausted. Thus, at the end of the exhaust or downward stroke of the piston, a charge has again been forced into the combustion chamber 12, ready to be compressed during the upward stroke in the manner before described.

I have provided means for operating the valve 29 automatically, which comprises a vertical shaft 37, which is in the form of a hollow sleeve and carries at its lower end a bevel gear 38 meshing with a similar gear 39 on the crank shaft 15. On this hollow shaft is mounted a ball governor 40 of usual construction provided with a spring 41. Near the upper end of the hollow shaft 37 there is mounted thereon a disk cam 42 set at an oblique angle to the shaft, which cam, during its rotation with the shaft, operates upon a roller 43 mounted on a crank arm 44 on a horizontal shaft 45 journaled in suitable bearings 46 on top of the cylinder, whereby said shaft 45 is rocked as the hollow shaft 37 is rotated, with its cam 42. Projecting from the shaft 45 is a wing cam or wiper 47 which bears upon the stem 31 of the valve 29 whereby, when the shaft 45 is rocked as aforesaid, the wing 47 will alternately press downward on the stem 31 to open the valve 29, and yield upward to permit the spring 30 to close said valve.

The engine illustrated is of the ordinary two-cycle type and has two cylinders, the shaft 45 extending above both cylinders. While I have illustrated the interior construction of only one of these cylinders, it will be understood that the other is a duplicate thereof provided with the same mechanism, arranged to act alternately with the mechanism of the cylinder 10 as described. Thus, there is provided on the second cylinder a valve equivalent to the valve 29 held normally closed by a spring 48 between the top of the cylinder and a ring 49, and the stem is operated upon by a wing or wiper 51 which moves down and opens the valve when the wiper 47 moves up and permits the spring 30 to close the valve 29. The upper end of the hollow shaft 37 is enlarged and in this enlarged portion is provided an annular collar 52 to which is pivotally connected the end of a crank arm 53 on a short shaft 54 to which is also attached a handle 54' which is normally drawn away from the shaft 37 and commutator 55 by means of a spring 56. An arm 57 for regulating the time of operation of the sparking mechanism projects from the handle 54' and may be operated by manually manipulating said handle in a manner usual to this class of engines. As the hollow shaft 37 is rotated on the interior stem 58, the arm 53 is operated by the governor and causes the handle 54' to move toward or away from the commutator in accordance with the speed at which the engine is being run, thus regulating the sparking mechanism automatically instead of manually.

When the explosion has taken place in the engine and the piston 11 moves down in the cylinder until its upper end is low enough to open the exhaust port 36 the pressure in the combustion chamber 12 is released and the gas from the primary compression chamber 25 is driven through the port 28 into the combustion chamber, clearing out the exploded gases and filling the combustion chamber with a fresh charge. The governor 40 is so regulated that the wiper 47 will press down on the stem of the valve 29 and open said valve, and hold it open until the piston has reached a point in its return stroke which reduces the capacity of the combustion chamber to the desired extent. The wiper 47 now rises and permits the valve 29 to close. The further upward or return stroke of the piston compresses the regulated quantity of gas in the combustion chamber 12 so that it is always compressed to the desired degree when the upper end of the piston stroke is reached. Until that point in the operation of the machinery is reached where the wiper 47 again presses down and opens the valve 29 the operation will be as usual in this type of engine.

By the mechanism described many advantages are obtained. The introduction in an engine of this two-cycle type of a port or passage communicating between the combustion chamber and the primary compressing chamber, said port being provided with a cut off valve and mechanism operated by the crank shaft of the engine, permits of the return, during compression stroke, of more or less of the new charge of gas to the primary compression chamber, thus producing several new results. It is thereby possible to vary the volume of compression of the new gas during the compression stroke. A complete range of speed control is secured by such variation to suit the variation of load or speed requirements. Greater fuel economy is obtained by operating the engine at the most effective ratio of expansion obtainable from a charge of exploded gas.

With the above construction wherein the timing device for the spark is connected to and shifted with the valve controlling mechanism, I am able to time the spark so that it will occur after the valve for the channel between the main combustion chamber and the primary compression chamber is closed. When the time of closing the valve is advanced, the time of spark will also be advanced, and thus for all adjustments of the engine there can be no possible chance of a spark prior to the closing of the intake valve, and, therefore, there can be no possible chance of back-firing into the primary compression chamber. This effect is produced by adopting the proper ratio of volume of compression space to the piston displacement and adjusting the cut off valve so that proper compression is secured, a portion of the new charge being returned to the primary compression chamber at each revolution. Another result obtained is that automatic ignition by high compression may be successfully employed by reason of the fact that the compression may be regulated to the exact firing point and not occur either too early or too late. A further degree of fuel economy is secured by thus operating the engine normally at a much higher than ordinary compression.

In the modification of Fig. 5 the valve construction and governor mechanism is not changed and the construction of the cylinder, the relative arrangement of the carbureter, the primary compression chamber, channel 27, combustion chamber, inlet port and exhaust port are the same as the construction of the other figures hereinbefore described. There is provided, however, a port 60 between the channel 27 and the combustion chamber, which port at its lower edge is even with the lower edge of the exhaust port but which is smaller in vertical diameter than the exhaust port so that, when the piston moves downward it first partially opens the exhaust port thus permitting of the first exhaust and before the exhaust port is wholly opened, opens the port 60 and admits fresh gas from the primary compression chamber into the combustion chamber.

Having thus described my invention what I claim as new and desire to secure by Letters Patent of the United States is:

1. A gas engine comprising a cylinder having a combustion chamber, a piston in said chamber, a fuel supply chamber, a communicating channel between said chambers, a valve for controlling said channel, and mechanism for actuating said valve whereby a portion of the mixed charge in the combustion chamber may be returned to the supply chamber, said mechanism including devices whereby the time of closing of said valve may be varied, a sparking device and mechanism connected to the valve actuating mechanism, and shiftable therewith for causing a spark subsequent to the closing of said valve.

2. A two-cycle gas engine comprising a cylinder having a combustion chamber, a piston in said cylinder, a primary compression chamber, a communicating channel between said chambers, a valve for controlling said channel mechanism for actuating said valve whereby a portion of the mixed charge in the combustion chamber may be returned to the compression chamber, said mechanism including devices whereby the time of closing said valve may be varied, a sparking device and mechanism connected to the valve actuating mechanism and shiftable therewith for causing a spark subsequent to the closing of said valve.

3. A two-cycle gas engine comprising a cylinder having a combustion chamber, a piston in said cylinder, a primary compression chamber, a communicating channel between said chambers, a valve for controlling said channel, mechanism for actuating said valve whereby a portion of the mixed charge in the combustion chamber may be returned to the compression chamber, said mechanism including devices whereby the time of closing said valve may be automatically varied by the speed of the engine shaft, a sparking device and mechanism connected to the valve actuating mechanism and shiftable therewith for causing a spark subsequent to the closing of said valve.

4. A two-cycle gas engine comprising a cylinder having a combustion chamber, a piston in said cylinder, a primary compression chamber, a communicating channel between said chambers, a valve for controlling said channel, mechanism for actuating said valve whereby a portion of the mixed charge in the combustion chamber may be returned to the compression chamber, said mechanism including devices whereby the time of closing said valve may be automatically varied by the speed of the engine shaft, a sparking device and mechanism connected to the valve actuating mechanism and shiftable therewith for causing a spark subsequent to the closing of said valve, and manually controlled means for shifting the valve actuating mechanism for manually varying the time of closing said valve.

5. A gas engine comprising a cylinder having a combustion chamber, a piston in said chamber, a fuel supply port, a valve for controlling said port, and mechanism for actuating said valve whereby a portion of the mixed charge in the combustion chamber is allowed to escape from the combustion chamber, said mechanism including devices whereby the time of closing of said valve may be varied in order to vary the speed or power of the engine, a sparking device and mechanism connected to the valve actuating mechanism and shiftable therewith for causing the spark subsequent to the closing of the valve for the intake port.

In testimony whereof I affix my signature in presence of two witnesses.

MILAN W. HALL.

Witnesses:
 E. WALTON BREWINGTON,
 HOWARD D. ADAMS.